United States Patent [19]
Cherukuri et al.

[11] Patent Number: 5,600,798
[45] Date of Patent: Feb. 4, 1997

[54] SYSTEM AND METHOD FOR CONTROLLING LAN DATA FLOW CONTROL THROUGH A FRAME RELAY NETWORK BY END POINT STATION TRANSMITTING NOTIFICATION TO LAN STATIONS BASED ON CONGESTION NOTIFICATION FROM THE FRAME RELAY NETWORK

[75] Inventors: Rao J. Cherukuri, Chapel Hill; Fuyung Lai, Raleigh; Kian-Bon K. Sy, Cary, all of N.C.

[73] Assignee: International Business Machines Corporation, Armonk, N.Y.

[21] Appl. No.: 143,003

[22] Filed: Oct. 26, 1993

[51] Int. Cl.⁶ .................................................. H04L 12/46
[52] U.S. Cl. ............................. 395/200.13; 395/200.02
[58] Field of Search ............... 370/58.1, 60; 395/200.13, 395/200.02

[56] References Cited

U.S. PATENT DOCUMENTS

| | | | |
|---|---|---|---|
| 5,042,029 | 8/1991 | Hayakawa | 370/60 |
| 5,208,811 | 5/1993 | Kashio et al. | 370/94.1 |
| 5,319,638 | 6/1994 | Lin | 370/60 |
| 5,361,259 | 11/1994 | Hunt et al. | 370/84 |
| 5,367,523 | 11/1994 | Chang et al. | 370/84 |
| 5,377,327 | 12/1994 | Jain et al. | 395/200 |

OTHER PUBLICATIONS

Fred Goldstein, "Congestion Control In Frame Relay Networks Using Explicit Binary Feedback", IEEE Computer & Communications, pp. 558–564 1991.
Tai et al., "Lan Interconnection: A Transparent, Shortest--Path Approach", Communications, IEEE Intenational Conference, pp. 1666–1670 1991.
Cherukuri et al., "Harmonization of the ISDN D–channel Link–Access Protocol With the IEEE 802.2 Logical–Link Control", Globecom '88, pp. 0711–0715 1988.
Gerla et al., "Congestion Control in Interconnected LANs", IEEE Network Magazine, pp. 72–76. Jan. 1988.
Raj Jain, "Congestion Control in Computer Networks: Issues and Trends", IEEE Network Magazine, pp. 24–30 May 1990.
Raj Jain et al., "Congestion Avoidance in Computer Networks with a Connectionless Network Layer; Concepts, Goals and Methodology", Computer Networking Symposium, pp. 134–143 1988.
Newman et al., "Backward Explicit Congestion Notification for ATM Local Area Networks", Globecom '93, pp. 719–723 1993.

Primary Examiner—Thomas C. Lee
Assistant Examiner—D. Dinh
Attorney, Agent, or Firm—Stephen T. Keohane; John J. Timar

[57] ABSTRACT

The system and method of the present invention provide a mechanism, for the purpose of efficiently interconnecting local area networks (LANs) across a frame relay network, by which LAN stations provide data flow control when the frame relay network becomes congested. The system of the invention comprises a Station Manager at the network end point internetworking unit (IWU) for managing the IWU, a LAN Manager for managing one or more LANs connected to the end point IWU, and Station Managers at each of the LAN stations managing the respective LAN station. In operation, the IWU receives from the frame relay network a congestion notification and the IWU Station Manager broadcasts this notification to its managed LAN station Station Managers. The LAN station Station Managers each examine the notification against its outstanding data to be transmitted and slows down data traffic that is destined for the congested portion of the frame relay network.

18 Claims, 5 Drawing Sheets

Source Routing PDU

Nonsource Routing PDU

FR Frame

SYSTEM AND METHOD FOR CONTROLLING LAN DATA FLOW CONTROL THROUGH A FRAME RELAY NETWORK BY END POINT STATION TRANSMITTING NOTIFICATION TO LAN STATIONS BASED ON CONGESTION NOTIFICATION FROM THE FRAME RELAY NETWORK

BACKGROUND OF THE INVENTION

I. Field of the Invention

The present invention relates to data flow through a frame relay network and, more particularly, to a system and method for controlling the data flow from a LAN (local area network) station through a frame relay network when the frame relay network becomes congested.

II. Background and Prior Art

As users have moved along the path toward decentralized processing, local connectivity problems have been solved by attaching network elements—workstations, minicomputers, and microcomputers—via local area networks (LANs). Further, as users wanted to have global communications that make any device anywhere appear as if it were attached to the local LAN, LANs spread across the globe have become internetworked across wide area networks (WANs). Because LAN interconnect data is bursty and unpredictable, "fast packet" services, which provide bandwidth on demand (such as frame relay), are the networking technologies of choice for interconnecting LANs.

Frame relay is a multiplexed data networking service supporting connectivity between internetworking units (IWUs), such as bridges and routers, and between IWUs and carrier networking equipment. IWUs which are normally located at the customer premises may be called customer premises equipment (CPE). In frame relay, which can be considered the successor to the CCITT X.25 packet standards, error correction and flow control are handled at network end points, i.e., at the IWUs. Frame relay accelerates the process of routing packets through a series of switches to a remote location by eliminating the need for each switch to cheek each packet it receives for errors before relaying it to the next switch. Instead, only the IWUs at the network end points cheek for errors. This error treatment increases performance and reduces bandwidth requirements, which in turn can reduce communications costs and decrease the number of packet handling devices needed in the network.

Furthermore, flow control is conducted by the IWUs at the end points of the network only—no flow control is presently conducted between the user and the network end point. Thus, the IWU connecting with the frame relay network is charged with controlling the flow of data frames into the network, i.e., slowing down or speeding up the data traffic into the network based upon the network's present load.

The frame relay technologies are defined as having to provide the IWU with a congestion notification so that the IWU can assist in clearing the network by not forwarding any additional data frames until the network is adequately clear for transmission. These congestion notification messages are denoted as FECN (forward explicit congestion notification) and BECN (backward explicit congestion notification) and indicate that the network is congested. These indicators, as well as the rate control concept based upon CIR (committed information rate), are used to protect the frame relay network from congestion. The IWU receiving either of these indicators (FECN or BECN) responds accordingly, as will be discussed below.

With regard to the LAN data traffic, in a normal LAN environment, i.e., in an environment where there is no LAN interconnection, stations connected to the LAN perform certain network control functions, such as error correction and flow control. With regard to flow control, LAN stations conforming to the IEEE 802.2 recommendation will provide a logical link connection (LLC) protocol element which implements a dynamic window flow control mechanism. This mechanism when activated will reduce the window size through which data may pass to a fraction of its original value, and in accordance with the success of subsequent transmissions, the window size will automatically increase, until it returns to its original value.

Due to the use of the IWU at the boundary between the frame relay network and the LAN, however, the frame relay network is transparent to the LAN station and, thus, the LAN station cannot perform any flow control function. The LAN station has no way of knowing that the frame relay network is congested as it does not know that the frame relay network is even there. Thus, the LAN station of the prior art must depend upon the IWU at the network boundary to receive all of the data destined to cross the frame relay network and to control its flow when the network becomes congested.

FIG. 1 shows an example of a network 10 having four local area networks (LAN1 12, LAN2 14, LAN3 16 and LAN4 18) interconnected through a frame relay network 15. Station A1 22 is connected directly to LAN1 12 while station A2 24 is connected directly to LAN4 18. Bridges B1 26 and B2 28 perform bridging functions to interconnect LAN1 12 and LAN2 14 (B1 26) and to interconnect LAN3 16 and LAN4 18 (B2 28). Routers R1 30 and R2 32 perform the routing functions to interconnect LAN2 14 and LAN3 16 to the frame relay network 15, respectively. Routers R1 30 and R2 32 represent the IWUs at the frame relay network end points as discussed above.

In present systems, when the frame relay network 15 becomes congested, it sends to routers R1 30 and R2 32 an indication to slow the flow of data into the network. These are the B ECN and FECN indicators discussed above. Upon receiving either of these indicators, router R1 30 (R2 32) will store the frames of data that it receives from LANs 1 and 2 (LANs 3 and 4) until the data can be safely transmitted over the network 15. In the meantime, however, stations connected to each LAN continue to forward frames of data to router R1 30 (and router R2 32) as if the network were clear. Router R1 30 (R2 32) merely stores this data in a queue in its buffer storage area until there is an indication from the network that a higher volume of data may pass.

For instance, when a frame is sent from a user (which is a router in the above example) to its target through a frame relay network, if the network experiences congestion in the same direction as the frame to going, FECN will be activated. If the congestion is in the opposite direction, BECN will be activated. The frame relay network expects users to slow data flow when BECN or FECN is activated, the manner in which the traffic is slowed is at the user's discretion. Many users, however, do not take appropriate actions and continue to pump frames into the network which results in frames being discarded by the network.

In the cases where a router takes appropriate action and slows the data traffic to the congested network, there is a problem in the case where the router is receiving too much data for transmission across the frame relay network. If the network is congested, the router stems the data flow by storing the data that it receives in internal buffers but, because it is receiving so much data from the LAN stations, it may run out of buffer storage space for the incoming data. Because it has no mechanism for indicating to the attached stations to slow or stop the data flow, this data will be discarded and lost.

Even where the router or other CPE has sufficient storage space for storing all of the outgoing data frames, the router cannot retrieve the stored data frames quickly enough for transmission onto the network after the network is clear as this requires much processing effort. Thus, the router (or other IWU) becomes the bottleneck to the LAN data traffic. This problem is especially common when the router receives high volume, bursty data traffic from the LAN stations for transmission over the frame relay network.

Thus, it can be seen that with present systems, there is no mechanism for efficiently interconnecting local area networks (LANs) through a frame relay network. Present systems do not allow workstations connected to the LANs to provide flow control for data that the workstations are transmitting over the frame relay network when the network becomes congested. Instead, the network end points are solely responsible for this task which ultimately results in the end points themselves becoming the bottlenecks to the network traffic as their buffer storage overflows and data is lost.

SUMMARY OF THE INVENTION

The system and method of the present invention provide a mechanism, for the purpose of efficiently interconnecting local area networks (LANs) across a frame relay network, by which LAN stations provide data flow control when the frame relay network becomes congested. The system of the invention comprises a Station Manager at the network end point internetworking unit (IWU) for managing the IWU, a LAN Manager for managing one or more LANs connected to the end point IWU, and Station Managers at each of the LAN stations managing the respective LAN station. In operation, the IWU receives from the frame relay network a congestion notification and the IWU Station Manager sends this notification to its managed LAN station Station Managers. The LAN station Station Managers each examine the notification against its outstanding data to be transmitted and slows down data traffic that is destined for the congested portion of the frame relay network.

BRIEF DESCRIPTION OF THE DRAWINGS

While the technical description concludes with claims particularly pointing out and distinctly claiming that which is regarded as the invention, details of a preferred embodiment of the invention may be more readily ascertained from the following technical description when read in conjunction with the accompanying drawings, where:

DETAILED DESCRIPTION OF THE PREFERRED EMBODIMENT

Figure 1:
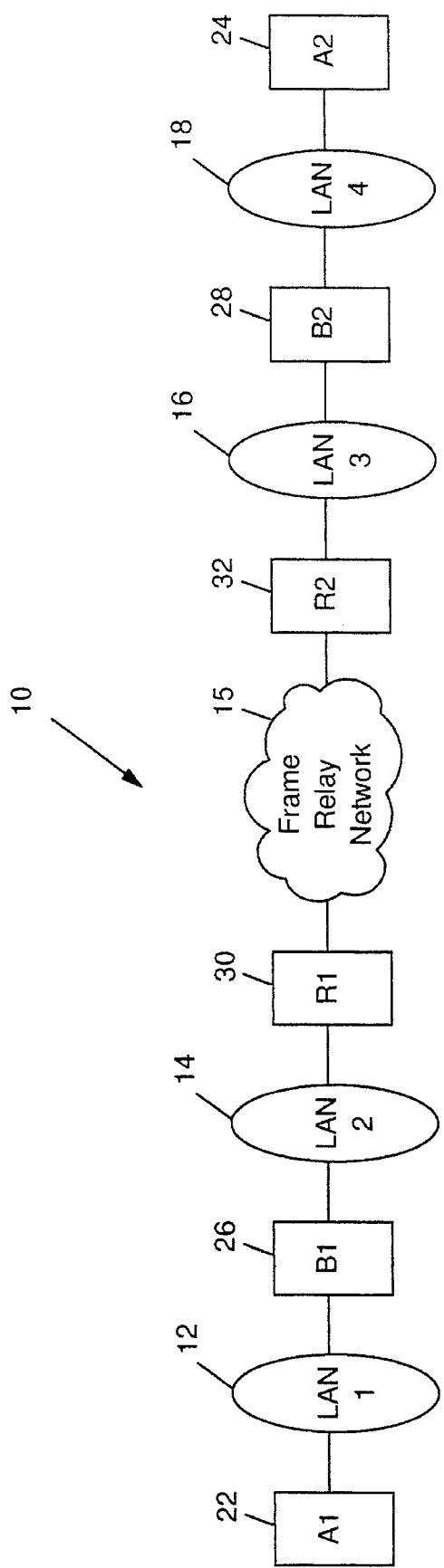
FIG. 1 is a diagram of a representative communications network.
Figure 2:
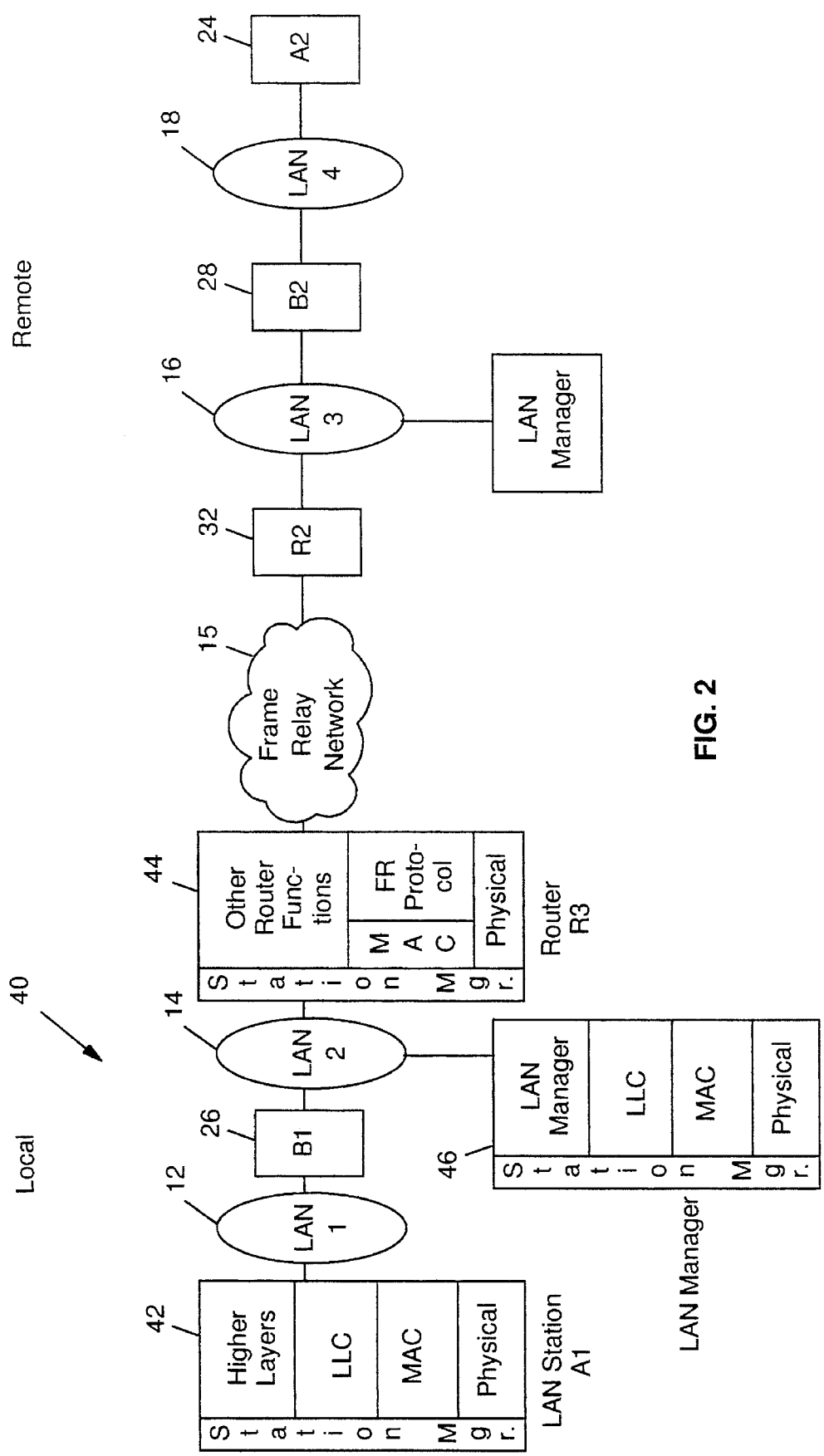
FIG. 2 depicts another communications network in which the present invention is embodied.

A system embodying the present invention is shown in FIG. 2. As can be seen in the figure, the system 40 for interfacing with the frame relay FR network 15 comprises a LAN workstation A1 42, a router R3 44 and a LAN Manager 46. The system 40 further comprises LAN1 and LAN2 12 and 14, respectively, and bridge B1 26. LAN1, LAN2 and bridge B1 remain unchanged in implementing the present invention.

As can be seen, each of the system components, LAN workstation A1 42, router R3 44 and newly added LAN Manager 46, comprises a plurality of elements. In particular, referring first to the LAN Manager 46, the LAN Manager comprises a physical layer element, a media access control (MAC) protocol element, a logical link control (LLC) protocol element, a LAN Manager element and a Station Manager element. Each element performs a different and necessary function of the LAN Manager.

The physical layer element, which is analogous to the physical layer of the seven-layer OSI Model, provides the actual physical connectivity to LAN2 14 by supporting the LAN medium such as unshielded twisted pair, coaxial or fiber optic cabling for the transmission of bit streams across the particular LAN medium.

The MAC element is responsible for managing the traffic on the LAN. It performs functions such as determining when the LAN media is free to transmit data, detects collisions of data on certain types of LANs, and determines when transmission should be re-initiated.

The LLC element provides the interface between the LAN and the user layers. LLC can be configured to provide a very basic service (connectionless) or a very elaborate service of dealing with connection-oriented operations. In addition, an LLC element of a LAN station conforming to IEEE 802.2 provides data flow control in the form of a dynamic flow control window mechanism. This mechanism when activated will reduce the window size through which data may pass to a fraction of its original value, and in accordance with the success of subsequent transmissions, the window size will automatically increase, until it returns to its original value.

The Station Manager element is an element implemented in each LAN station. The Station Manager manages the particular LAN station on which it resides. Further, each Station Manager has a functional address (usually in the form of a MAC address). By way of the functional address, each Station Manager may be addressed.

The LAN Manager element manages all of the Station Managers within its domain, where a domain may spread physically across multiple LANs. The LAN Manager manages the Station Managers by accepting unsolicited reports from them and by issuing commands for them to execute. Like the Station Managers, the LAN Manager also has a functional address and uses the Station Managers functional addresses for communicating therewith.

Referring now to LAN station A1, LAN station A1, similar to the LAN Manager, comprises a physical layer element, a MAC layer element, an LLC layer element and a Station Manager element. These elements act in the same manner and perform the same function as described above for the LAN Manager.

In addition, the LAN station A1 comprises a "higher layers" element. This element is merely a representation of any additional function, above the LLC layer functions, that the workstation may have. Some examples are software development and engineering design application programs.

Referring now to the router, router R3 likewise comprises a Station Manager element, a physical layer element and a MAC protocol element, and, in addition, a frame relay (FR) protocol element, and an "other router functions" element. The physical layer element, like the physical layer element of the LAN Manager, provides the actual physical connectivity to LAN2 14 in the same manner described. In addition, however, it provides physical connectivity to the FR network 15 by supporting either a classical RS422, X.21, V.35 (fast RVX) or High Speed Serial Interface (HSSI).

The MAC layer and Station Manager elements act in the same manner and perform the same functions described above for the LAN Manager.

The FR Protocol element supports functions which allow the router to be attached to the FR network. In addition to interfacing with the physical layer element, the FR Protocol element acts as a data link control layer by supporting I.121 functions such as frame delimiting, frame multiplexing/demultiplexing, frame check sequence, etc.

Furthermore, the FR Protocol element supports the BECN and FECN mechanisms by which the frame relay network notifies its end points that the network is congested. For example, when the network is congested, the network will issue a congestion notification frame to its end points indicating that the network is congested (via the BECN bit or the FECN bit). Further, in that same frame, the network will identify which data link connection identifier (DLCI), or DLCIs, is associated with the congestion. The FR Protocol element receives congested DLCI, performs the necessary mapping (to be discussed further below), and forwards these results to its Station Manager for forwarding to the LAN Manager. The LAN Manager notifies the appropriate LAN Stations that the frame relay network is congested and to slow the data traffic flow to the router.

The "other router functions" element performs such other router functions as offering flow control mechanisms as well as source routing and nonsource routing features (to be discussed below).

Figures 3, 4, 5:
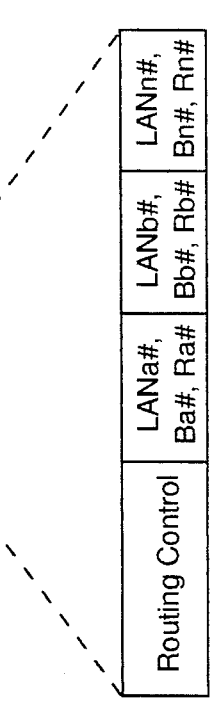
FIG. 3 is a simplified diagram illustrating a protocol data unit (PDU) used in a source routing system.
FIG. 4 is a simplified diagram illustrating a PDU used in a transparent tree routing system.
FIG. 5 is a simplified diagram illustrating the fields of a data frame as transmitted across a FR network.

The method and system of the present invention operate with LANs using either type of routing: source routing and nonsource (normally, transparent tree) routing. In source routing, the source element (host) dictates the routes of the protocol data unit (PDU) through the internet. The source element places the addresses of the "hops" (the intermediate elements or IWUs) in the PDU. An example of a source routing PDU is shown in FIG. 3. Generally, a source routing PDU comprises a number of fields, including a Control field, a Destination Address (DA) field, a Source Address (SA) field, a Routing Information (RI) field, a Data field, and a Frame Check Sequence (FCS) field for error checking and correction. In the RI field, the source element, such as a LAN station, places the addresses of the IWUs through which the data must pass to reach the destination element. In the figure, these IWUs include the numbers (addresses) of LANa, Bridge a (Ba), Router a (Ra), LANb, Bb, Rb, and LANn, Bn, and Rn.

In nonsource routing, the IWUs make decisions about the route and do not rely on the PDU to contain information about the route. FIG. 4 illustrates an example nonsource routing PDU. As with the source routing PDU, the nonsource routing PDU comprises a Control field, a Data field and an FCS field. In addition, the nonsource routing PDU comprises a Source MAC Address field and a Destination MAC Address field. The IWUs in the network use these two addresses to properly forward the PDU to the destination element through the use of "look-up" tables.

FIG. 5 illustrates the format of a frame relay network (FR) frame. The FR frame comprises flags at either end to indicate the start and end of the frame, a Data field and a Frame Cheek Sequence field for error checking and correction. In addition, the FR Frame comprises an Address field consisting of data link connection identifier (DLCI) (high order) and DLCI (low order) fields, a C/R field, an EA 0 and an EA 1 field, a DE field, and FECN and BECN fields. The C/R (command/response indication), the EA (address field extension bit), and the DE (discard eligibility indicator) fields are not particularly relevant to the invention and will not be discussed. The DLCI (high order) and DLCI (low order) fields are used together to represent the address of the destination element. The FECN and BECN fields, as discussed to a certain extent above, are used by the frame relay network to notify its end points that the network is congested, either in the forward or backward direction.

In general, the system of the present invention operates as follows. The stations on the local area networks (such as A1 on LAN1) transmit data to router R3 for transmission across frame relay network 15. When frame relay network 15 becomes congested, the network 15 sends a congestion notification to router R3 (by setting the BECN bit in the FR frame for a predetermined period of time). The frame relay network includes with the congestion notification frame the DLCI of the congested portion of the network. This indicates to router R3 that the network is congested at that DLCI.

As mentioned, the FR Protocol element maps the congested DLCI to the affected LAN Stations. Where source routing is being used, the FR Protocol element parses the frame and maps the congested DLCI as reported by the frame relay network to determine the affected remote LAN segment. Where nonsource routing is being used, the FR Protocol element determines from the look-up table which LAN stations are affected by the congested DLCI (LAN stations are mapped to a particular DLCI in the look-up table).

The router's Station Manager conveys this information to the LAN Manager which, in turn, conveys the information to the remainder of the Station Managers by sending a message to their respective functional addresses. Each of the Station Managers then determines whether its station is or will be transmitting data to the affected portion of the network. If so, the dynamic window flow control mechanism is used to slow down the data flow to the router and, in particular, the data flow destined for the affected portion. If, after a period of time, the network remains congested at the previous DLCI, the FR Protocol element resends the message to its Station Manager that the network is congested and the process, as discussed above, is repeated.

Figure 6:
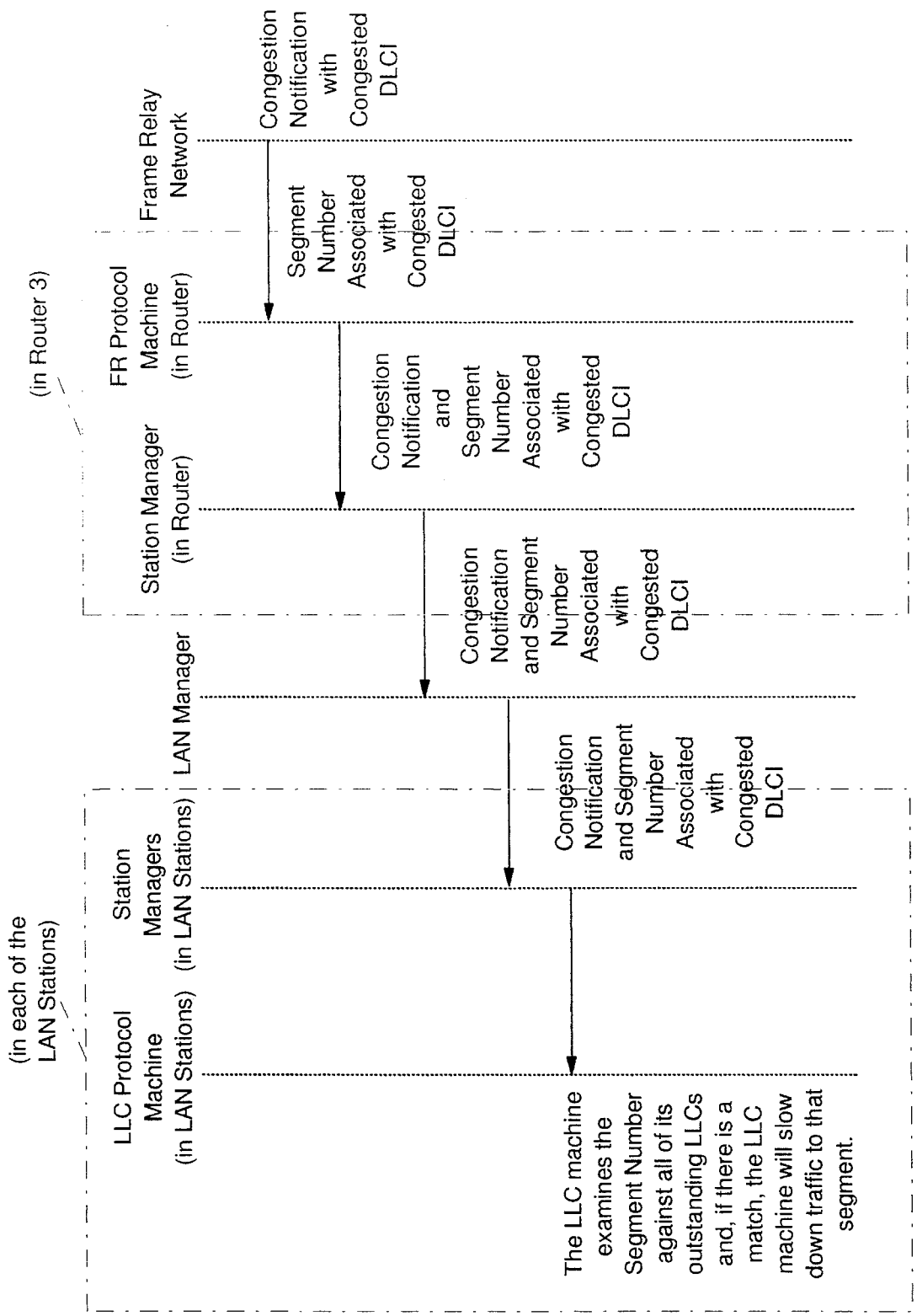
FIG. 6 depicts a diagram illustrating the flow of messages between the frame relay network, a connected IWU (router), and connected LAN stations when the frame relay network is congested and source routing is being used by the LAN stations.
Figure 7:
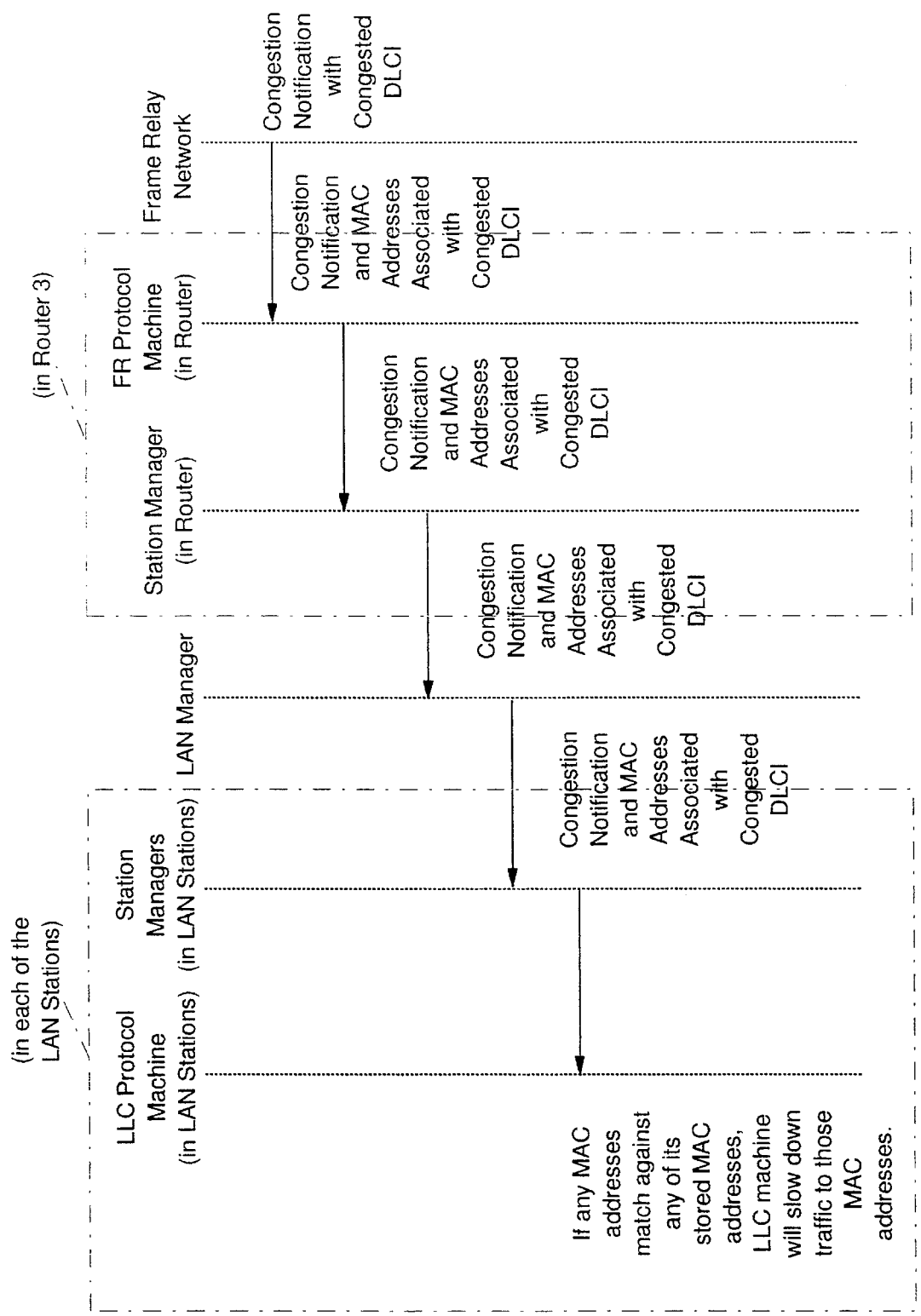
FIG. 7 depicts a diagram illustrating the flow of messages between the frame relay network, a connected IWU (router), and connected LAN stations when the frame relay network is congested and transparent tree routing is being used by the LAN stations.

FIGS. 6 and 7 illustrate message flows between the network and the network components in implementing the present invention, first, where source routing is required (FIG. 6) and, second, where transparent tree routing is used (FIG. 7). Referring to FIG. 6, after the FR network becomes congested, it sends a congestion notification (with an indication of the congested DLCI) to router R3 (which is received by the FR Protocol Element). Along with performing its required functions, i.e., frame delimiting, frame multiplexing/demultiplexing, frame cheek sequence, etc., the FR Protocol Element parses the frame so that the DLCI is in the form of a segment number so that the LAN stations may understand it. The FR Protocol element then forwards this information (in the form of a congestion notification along with the segment number associated with the congested DLCI) to its Station Manager (in router R3). R3 Station Manager then sends this information to its LAN Manager 46. Because the LAN Manager can communicate with each of the Station Managers, it forwards this information to each of them in messages sent to their respective functional addresses. The Station Managers forward this information to their respective LLC protocol elements. The LLC protocol elements examine the segment number associated with the congested DLCI against their outstanding logical link connections (LLCs) which may or may not be to the congested segment. If there is a match, the corresponding LLC protocol element will slow down the data traffic associated with that segment number.

As was discussed, the workstations use the known window flow control mechanism for slowing down the traffic to that segment. Using this mechanism, the workstation's data output is slowed in accordance with a "window" size. The window size is reduced where there is network congestion to a particular segment as identified by the FR Protocol element. The window size is slowly increased (and, thus, data traffic), based upon successful transmissions of data frames. If the network remains congested at the particular DLCI, the FR Protocol element is notified of the congestion by a BECN or FECN flag and the process discussed above is repeated so that the window size is returned to its minimum value.

Referring now to FIG. 7, a message flow diagram for a transparent tree routing system is shown. As with the source routing system, the FR network issues a congestion notification with the congested DLCI to the FR Protocol element in the router R3. The FR Protocol element parses the frame so that the congested DLCI is in the form of a MAC address so that the LAN stations may understand it. As was mentioned above, each DLCI has a corresponding MAC address in a look-up table. The FR Protocol element maps the congested DLCI to its corresponding MAC address(es). The FR Protocol element forwards this information to its Station Manager in the form of a congestion notification along with the MAC addresses associated with the affected DLCI. The R3 Station Manager forwards this information directly to the LAN Manager which, in turn, sends it to the remaining Station Managers in its domain. As before, the Station Managers forward the information to their respective LLC Protocol elements which examine the affected MAC addresses against their outstanding LLCs. If there is a match, the Station Manager with the affected LLC will slow down its data traffic.

Thus, it can be seen that the method and system of the present invention provides a mechanism for efficiently interconnecting LANs through a frame relay network by allowing the LAN workstations connected to the LANs to provide flow control for data that the workstations are transmitting over the frame relay network when the network becomes congested. While the invention has been particularly shown and described with reference to preferred embodiments thereof, it will be understood by those skilled in the art that various other changes in form and detail may be made without departing from the spirit and scope of the invention.

What is claimed is:

1. For use with a frame relay network having an end point internetworking unit (IWU) connected thereto and one or more local area networks (LANs), each of said LANs conforming to one of a set of LAN protocols, all of said LAN protocols being different from the frame relay protocol, each LAN having one or more LAN stations connected thereto, said LANs being connected to said end point IWU so that said LAN stations may transmit data to said end point IWU for transmission over said frame relay network, said frame relay network providing a flow control mechanism for controlling the flow of data from said end point IWUs through said frame relay network, said frame relay network flow control mechanism comprising means for sending a frame relay network congestion notification identifying a congested portion of the frame relay network to said end point IWUs sending data to said congested portion, a system for controlling the flow of data from said LAN stations to said end point IWU, said system comprising:

a frame relay protocol element, connected to said end point IWU, for receiving from said frame relay network a frame relay network congestion notification that said frame relay network is congested and for processing said frame relay network congestion notification to determine which portion of said frame relay network is congested;

an end point IWU station manager connected to said frame relay protocol element for transmitting a LAN notification identifying said congested portion in a format conforming to the LAN protocol, based upon said frame relay network congestion notification, to said LAN stations for said LAN stations to slow the flow of data to said end point IWU destined for said congested portion;

means, connected to said end point IWU station manager and said LAN stations, for receiving said LAN notification and a plurality of LAN station managers, each LAN station manager being connected to a corresponding LAN station, for receiving said LAN notification, for processing said LAN notification identifying said congested portion of said network, for determining whether any data is to be sent from said LAN station to said congested portion of said network and, if so, for slowing the flow of data destined for said congested portion to said end point IWU from said LAN stations.

2. The system defined in claim 1 wherein said end point IWU comprises a router for transmitting data to said frame relay network from said LAN stations and to said LAN stations from said frame relay network.

3. The system defined in claim 1 wherein said end point IWU comprises a media access control (MAC) protocol element for acting as an interface between said frame relay protocol element and said end point IWU station manager.

4. The system defined in claim 3 wherein each of said LAN stations comprises a MAC protocol element and a logical link connection (LLC) protocol element, said LLC protocol element conforming to the IEEE 802.2 recommendation as having a dynamic window flow control mechanism.

5. The system defined in claim 4 wherein said end point IWU frame relay protocol element has a backward explicit congestion notification (BECN) mechanism.

6. For use with a frame relay network having an end point internetworking unit (IWU) connected thereto and one or more local area networks (LANs), each of said LANs conforming to one of a set of LAN protocols, all of said LAN protocols being different from the frame relay protocol, each LAN having one or more LAN stations connected thereto, each LAN station having a LAN station manager connected thereto, said LANs being connected to said end point IWU so that said LAN stations may transmit data to said end point IWU for transmission over said frame relay network, said frame relay network providing a flow control mechanism for controlling the flow of data from said end point IWUs through said frame relay network, said frame relay network flow control mechanism comprising means for sending a frame relay network congestion notification identifying a congested portion of the frame relay network to said end point IWUs sending data to said congested portion, a method for controlling the flow of data from said LAN stations to said end point IWU, said method comprising the steps of:

in said end point IWU, receiving from said frame relay network a frame relay network congestion notification that said frame relay network is congested;

in said end point IWU, processing said frame relay network congestion notification and determining said congested portion;

transmitting a LAN notification identifying said congested portion, based upon said frame relay network congestion notification, said LAN notification being in a different format than said frame relay network congestion notification and conforming to the LAN protocol, from said end point IWU to said LAN stations for said LAN stations to slow down the transmission of data to said end point IWU destined for said congested portion;

receiving in said LAN station managers said LAN notification;

in each LAN station manager, processing said LAN notification identifying said congested portion of said network, determining whether any data is to be sent from said LAN station to said congested portion of said network and, if so, slowing the flow of data destined for said congested portion to said end point IWU from said LAN stations.

7. The method defined in claim 6 wherein said step of determining which portion of said frame relay network is congested further comprises the step of interpreting a data link connection identifier (DLCI) received from said frame relay network identifying said congested portion, and the step of converting said DLCI into a media access control (MAC) address associated with said congested DLCI.

8. The method defined in claim 7 wherein said step of slowing the flow of data destined for the congested portion of the frame relay network comprises the step of examining said MAC address associated with said congested DLCI against MAC addresses of data yet to be transmitted to determine whether there is a match and, if there is a match, slowing the flow of said data having MAC addresses which match said congested DLCI.

9. The method defined in claim 6 wherein said step of determining which portion of said frame relay network is congested further comprises the step of interpreting a data link connection identifier (DLCI) received from said frame relay network identifying said congested portion, and the step of converting said DLCI into a segment number.

10. The method defined in claim 9 wherein said step of slowing the flow of data destined for the congested portion of the frame relay network comprises the step of examining said segment number associated with said congested DLCI against segment numbers of data yet to be transmitted to determine whether there is a match and, if there is a match, slowing the flow of said data having segment numbers which match said congested DLCI.

11. For use with a frame relay network and one or more local area networks (LANs), each of said LANs conforming to one of a set of LAN protocols, all of said LAN protocols being different from the frame relay protocol, each LAN having one or more LAN stations connected thereto, said LAN stations having data for transmission across said frame relay network, said frame relay network providing a flow control mechanism for controlling the flow of data from said end point IWUs through said frame relay network, said frame relay network flow control mechanism comprising means for sending a frame relay network congestion notification identifying a congested portion of the frame relay network to said end point IWUs sending data to said congested portion, an end point internetworking unit (IWU) connected to said frame relay network and to said LANs for controlling the flow of data from said LAN stations to said end point IWU and across said frame relay network, said end point IWU comprising:

means for receiving data from said LAN stations;

means for forwarding said LAN station received data across said frame relay network;

a frame relay protocol element for receiving data from said frame relay network;

means for forwarding said frame relay network received data to said LAN stations;

means for receiving from said frame relay network a frame relay network congestion notification that said frame relay network is congested and for processing said frame relay network congestion notification to determine which portion of said frame relay network is congested; and an end point IWU station manager connected to said frame relay protocol element for transmitting a LAN notification identifying said congested portion in a format conforming to the LAN protocol, based upon said frame relay network congestion notification, to said LAN stations for said LAN stations to slow the flow of data to said end point IWU destined for said congested portion.

12. The end point IWU defined in claim 11 wherein said end point IWU comprises a router for transmitting data to said frame relay network from said LAN stations and to said LAN stations from said frame relay network.

13. The end point IWU defined in claim 11 wherein said end point IWU further comprises a media access control (MAC) protocol element for acting as an interface between said frame relay protocol element and said end point IWU station manager.

14. For use with a frame relay network having an end point internetworking unit (IWU) connected thereto and one or more local area networks (LANs), each of said LANs conforming to one of a set of LAN protocols, all of said LAN protocols being different from the frame relay protocol, each LAN having one or more LAN stations connected thereto, said LANs being connected to said end point IWU so that said LAN stations may transmit data to said end point IWU for transmission over said frame relay network, said frame relay network providing a flow control mechanism for controlling the flow of data from said end point IWUs through said frame relay network, said frame relay network flow control mechanism comprising means for sending a frame relay network congestion notification identifying a congested portion of the frame relay network to said end point IWUs sending data to said congested portion, a method for controlling the flow of data from said LAN stations to said end point IWU, said method in said end point IWU comprising the steps of:

receiving from said frame relay network a frame relay network congestion notification that said frame relay network is congested;

in said end point IWU, processing said frame relay network congestion notification and determining said congested portion;

transmitting a LAN notification identifying said congested portion in a format conforming to the LAN protocol, based upon said frame relay network congestion notification, to said LAN stations for said LAN stations to slow the flow of data to said end point IWU destined for said congested portion.

15. The method defined in claim 14 wherein said step of determining which portion of said frame relay network is congested further comprises the step of interpreting a data link connection identifier (DLCI) received from said frame relay network identifying said congested portion, and the step of converting said DLCI into a media access control (MAC) address associated with said congested DLCI.

16. The method defined in claim 14 wherein said step of determining which portion of said frame relay network is congested further comprises the step of interpreting a data link connection identifier (DLCI) received from said frame relay network identifying said congested portion, and the step of converting said DLCI into a segment number.

17. For use with a frame relay network having an end point internetworking unit (IWU) connected thereto and one or more local area networks (LANs), each LAN having one or more LAN stations connected thereto, each of said LANs conforming to one of a set of LAN protocols, all of said LAN protocols being different from the frame relay protocol, said LANs being connected to said end point IWU so that said LAN stations may transmit data to said end point IWU for transmission over said frame relay network, said frame relay network providing a flow control mechanism for controlling the flow of data from said end point IWUs through said frame relay network, said frame relay network flow control mechanism comprising means for sending a frame relay network congestion notification identifying a congested portion of the frame relay network to said end point IWUs sending data to said congested portion, a method for controlling the flow of data from said LAN stations to said end point IWU, said method in at least one of said LAN stations comprising the steps of:

receiving from said end point IWU a LAN notification based upon a frame relay network congestion notification, that said frame relay network is congested, said LAN notification conforming to the LAN protocol and in a different format than said frame relay network congestion notification;

processing said LAN notification and identifying from said LAN notification said congested portion of said frame relay network;

determining whether any data is to be sent from said LAN station to said congested portion of said network and, if so, slowing the flow of data destined for said congested portion to said end point IWU from said LAN station.

18. The method defined in claim 17 wherein said step of slowing the flow of data destined for the congested portion of the frame relay network comprises the step of examining said indication as to said congested portion against the destination of data yet to be transmitted to determine whether there is a match and, if there is a match, slowing the flow of said data having a destination which matches said congested portion.

* * * * *